United States Patent
Wu et al.

(10) Patent No.: US 11,964,902 B2
(45) Date of Patent: Apr. 23, 2024

(54) METHOD FOR PREPARING LEAD SMELTING SLAG GLASS-CERAMICS BASED ON THE OXIDATION OF SILICON-RICH SILICON SMELTING SLAG AND COMPOSITION ADJUSTMENT

(71) Applicant: BEIJING UNIVERSITY OF TECHNOLOGY, Beijing (CN)

(72) Inventors: Yufeng Wu, Beijing (CN); Xiaomin Liu, Beijing (CN); Dean Pan, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/389,556

(22) Filed: Nov. 14, 2023

(65) Prior Publication Data
US 2024/0076229 A1 Mar. 7, 2024

Related U.S. Application Data

(63) Continuation of application No. PCT/CN2021/138156, filed on Dec. 15, 2021.

(30) Foreign Application Priority Data

Jun. 29, 2021 (CN) .......................... 202110723959.8

(51) Int. Cl.
| | | |
|---|---|---|
| C03B 1/00 | (2006.01) | |
| C03B 19/06 | (2006.01) | |
| C03B 19/10 | (2006.01) | |
| C03C 1/00 | (2006.01) | |
| C03C 10/00 | (2006.01) | |

(52) U.S. Cl.
CPC ............ *C03C 10/0063* (2013.01); *C03B 1/00* (2013.01); *C03B 19/063* (2013.01); *C03B 19/1045* (2013.01); *C03C 1/002* (2013.01)

(58) Field of Classification Search
CPC .................................................. C03C 10/0063
See application file for complete search history.

(56) References Cited

U.S. PATENT DOCUMENTS 5,496,392 A * 3/1996 Sims ....................... C03C 13/06
588/314

FOREIGN PATENT DOCUMENTS

| CN | 103539357 A | * | 1/2014 |
| CN | 103539357 A | | 1/2014 |

(Continued)

OTHER PUBLICATIONS

International Search Report for PCT/CN2021/138156.

(Continued)

*Primary Examiner* — Cynthia Szewczyk
(74) *Attorney, Agent, or Firm* — J.C. PATENTS (57) ABSTRACT

The invention discloses a method for preparing lead smelting slag glass-ceramics based on the oxidation of silicon-rich silicon smelting slag and composition adjustment, and belongs to the technical field of resource utilization of smelting slag rich in monatomic silicon. The method comprises the steps: mixing the silicon slag rich in monatomic silicon with an oxidant, a fluxing agent and a clarifying agent according to a formula ratio, ball-milling and screening to obtain a tempering raw material with uniform size, and performing high-temperature oxidation melting on the tempering raw material to form an oxidation-state molten tempering material; and carrying out further mixed melting on the molten tempering material and hot lead slag, carrying out water quenching to obtain basic glass, and carrying out heat treatment system on the obtained basic glass to form the glass ceramics. According to the method, the smelting slag rich in monatomic silicon is subjected to oxidation tempering and mixed melting with the hot lead slag to prepare the basic glass, and the glass ceramics are obtained by regulat- (Continued)

ing and controlling the heat treatment system of the basic glass. The method is simple in technological process, high in production efficiency and low in cost, achieves the collaborative high-value conversion target of the silicon-rich silicon slag and the lead slag, and is easy to industrially popularize and apply.

3 Claims, 2 Drawing Sheets

(56) References Cited

FOREIGN PATENT DOCUMENTS

| | | | |
|---|---|---|---|
| CN | 106145686 A | 11/2016 | |
| CN | 108059351 A | 5/2018 | |
| CN | 108262846 A | 7/2018 | |
| CN | 108358455 A | 8/2018 | |
| CN | 108439809 A | 8/2018 | |
| CN | 111320388 A | 6/2020 | |
| CN | 112408804 A | 2/2021 | |
| CN | 112851121 A | 5/2021 | |
| CN | 113415997 A | 9/2021 | |
| WO | WO-2019071792 A1 * | 4/2019 | ............. C01B 33/20 |
| WO | WO2019071792 A1 | 4/2019 | |

OTHER PUBLICATIONS

Search Report for the priority application CN202110723959.8.
Supplemental Search Report for the priority application CN202110723959.8.

* cited by examiner

METHOD FOR PREPARING LEAD SMELTING SLAG GLASS-CERAMICS BASED ON THE OXIDATION OF SILICON-RICH SILICON SMELTING SLAG AND COMPOSITION ADJUSTMENT

CROSS-REFERENCE TO RELATED APPLICATIONS

The present application is a continuation of the international application PCT/CN2021/138156 filed on Dec. 15, 2021, which claims the priority to the Chinese Patent Application No. 202110723959.8, filed on Jun. 29, 2021. The entire contents of the above identified applications are incorporated herein by reference.

TECHNICAL FIELD

The invention belongs to the technical field of resource utilization of smelting slag. Specifically, it relates to a method for preparing lead smelting slag glass-ceramics based on the oxidation of silicon-rich silicon smelting slag and composition adjustment.

BACKGROUND

Silicon slag and lead slag are waste residues discharged during the silicon and lead smelting processes of the industrial silicon and lead smelting industries respectively.

With the booming development of these industries, the increasing demand for industrial silicon and lead has led to the increasing emissions of silicon slag and lead slag from the smelting process. The discharge of these waste residues not only pollutes the environment, but also takes up a large amount of valuable land resources. It is worth mentioning that for a type of silicon-rich silicon slag (silicon content: 10-20% elemental silicon), direct disposal will easily cause a waste of valuable components in the silicon slag. In order to avoid waste, there are currently three main ways to utilize the resources of this type of silicon-rich silicon slag: recovery of elemental silicon, preparation of high-purity silica and utilization of silicon slag microcrystalline vitrification.

In terms of the recovery of elemental silicon, some patents disclose the separation of slag silicon from silicon-rich silicon slag, achieving the goal of recovering elemental silicon from silicon-rich silicon slag.

CN 111348654A discloses a method for water quenching granulation of industrial silicon slag and separation of silicon and slag. A slag silicon mixture containing elemental silicon is obtained by water quenching and rapid cooling of molten silicon slag. The slag silicon mixture is subjected to solid-liquid separation and dehydration treatment to obtain elemental silicon and achieve the separation goal of silicon and slag. In addition, the cooled silicon slag can also be extracted from the elemental silicon in the silicon slag through multiple color sorting and remelting processes. This solution is described in detail in CN 111232987A. CN 111232988A mentions that the target of efficient separation of slag silicon can also be achieved through sequential color separation and flotation methods. The above research on the separation of slag silicon has enabled the recovery of valuable elemental silicon, but there is a lack of further research on the resource utilization of the remaining silicon slag. On the other hand, CN108516556A discloses a method for preparing high-purity silica using silicon slag, by adding sodium hydroxide solution to the silicon slag slurry for dissolution to obtain a sodium metasilicate solution; then adding sodium carbonate solution and passing in after carbonation and decomposition of $CO_2$ gas, metasilicate precipitate and sodium carbonate solution are obtained; the resulting metasilicate precipitate is pickled, washed and dried to obtain high-purity silica. Similarly, this method also lacks research on the resource utilization of remaining silicon slag.

In terms of microcrystalline vitrification, silicon slag is increasingly used as a raw material for the preparation of this type of material because it contains similar components.

Common silicon slag can be divided into low silicon slag and silicon rich silicon slag. Silicon slag with low silicon content can be prepared according to the existing patented waste slag building material conversion process. CN 103539357A discloses a silicon slag glass-ceramic and a preparation method thereof. Cold silicon slag and other auxiliary raw materials are batched and melted to form a molten glass liquid. The obtained glass liquid is further rolled, poured or water-quenched to form a basic glass, the basic glass is then subjected to crystallization heat treatment to obtain crystallized glass. However, for silicon-rich slag, it is difficult to obtain a homogeneous water-quenched glass frit using conventional melting systems and water quenching operations to process silicon-rich slag. Research published in CN 111348654A shows that elemental silicon is often easily retained in these water quenching slag materials, and the residue of elemental silicon is prone to have a great negative impact on the structure and performance of glass-ceramics prepared based on water quenching materials. Oxidation treatment of silicon-rich silicon slag is a feasible solution. CN110482865 A discloses a kind of crystallized glass and its preparation method and use. Silicon slag, auxiliary raw materials, oxidants or clarifiers are combined, integrated oxidation and melting are performed, and microcrystals are obtained after crystallization. However, this method is not convenient for controlling the oxidation degree of elemental silicon in silicon slag.

SUMMARY

The technical problem to be solved by the present invention is to overcome the problem that the oxidation degree of the elemental silicon component is difficult to control in the process of preparing glass-ceramics from silicon-rich silicon slag, which may lead to structural heterogeneity in the glass-ceramic precursor and the resulting performance deteriorates of glass-ceramic product. This invention provides a method for preparing lead smelting slag glass-ceramics based on the oxidation of silicon-rich silicon smelting slag and composition adjustment.

1. In order to solve the above technical problems, the present invention provides a method for pre-oxidizing and tempering silicon-rich silicon slag to achieve controllable oxidation of the elemental silicon component in the silicon slag to prepare lead slag glass-ceramics.

The method is to convert silicon slag rich in elemental silicon into an oxidized tempering material in advance, and then mix and melt the tempering material with hot lead slag to prepare glass-ceramics. The specific technical process (shown in FIG. 1) and scheme are as follows: The raw materials for preparing the glass-ceramics include oxidation tempering raw materials and lead slag, the ratio of their mass fractions is (35-55):(45-65), and the sum of the mass percentages of the lead slag and oxidation conditioning raw materials is 100%.

The oxidation conditioning raw material includes silicon slag, oxidant, flux and clarifier, and the silicon in the silicon slag exists in the form of elemental silicon, silicon carbide and anorthosite.

Wherein, the oxidizing agent includes manganese dioxide and sodium nitrate; the fluxing agent includes albite and borax; and the clarifying agent includes cerium oxide and sodium sulfate.

2. In the present invention, the silicon slag rich in elemental silicon is mixed with oxidants, fluxes and clarifiers in advance and melted at high temperature to obtain the oxidation state conditioning material.

The molten tempering material is further mixed with hot lead slag and quenched with water to obtain basic glass. The obtained basic glass is heat treated to form a $CaO$—$Al_2O_3$—$SiO_2$—$Fe_2O_3$ system of glass-ceramics. The crystallized phase size in the obtained glass-ceramics is uniform. Evenly distributed and has good physical and chemical properties.

3. Further, according to the method for preparing lead slag glass-ceramics by oxidizing and tempering silicon-rich silicon slag, the mass ratio between each component of silicon slag, oxidant, flux and clarifying agent in the raw material composition of the oxidation tempering material is: 35-55:1-5:4-7:1-3; the mass ratio of manganese dioxide and sodium nitrate used as oxidant is 1-4:0.5-5; the mass ratio of albite and borax used as flux is 2-6:0.3-4; the mass ratio of cerium oxide and sodium sulfate used as clarification agent is 1-2:0.5-3.

Further, the weight ratio between the components $SiO_2$, $CaO$, $Al_2O_3$, $Na_2O$, $K_2O$, $MgO$ and $ZnO$ in the silicon slag is 65-72:12-18:8-12:0.6-2:0.4-1:0.2-1:0.1-1; the silicon element in the silicon slag exists in the form of elemental silicon, silicon carbide and anorthosite, and its weight ratio is 15-30:30-60:5-10;

Furthermore, the oxidation conditioning raw materials weighed according to the formula are mixed and then melted at 1450-1500° C. and kept warm for 2-3 hours to obtain a melt of the oxidation conditioning material.

4. The described method for preparing lead slag glass-ceramics by oxidation and tempering of silicon-rich silicon slag is characterized in that the weight ratio between the components $SiO_2$, $CaO$, $Fe_2O_3$, $Al_2O_3$, $ZnO$ and $MgO$ in the lead slag is 32-36:10-20:20-30:5-10:2-6:1-4.

5. The described method for preparing lead slag glass-ceramics by oxidizing and tempering silicon-rich silicon slag is characterized in that the conditions for mixing the oxidation tempering material melt and hot lead slag are: mixing and melting at 1500-1550° C. 1-2.5h, a glass liquid with uniform composition will be formed.

7. The described method for preparing lead slag glass-ceramics by oxidation and tempering of silicon-rich silicon slag is characterized by transferring or pouring high-temperature glass liquid into pre-prepared water of less than or equal to 25° C., and the glass liquid instantly becomes glass particles. The glass particles are filtered out of the water and dried at 100 to 150° C.

8. The described method for preparing lead slag glass-ceramics by oxidation and tempering of silicon-rich silicon slag is characterized by crushing the water-quenched basic glass material in a crusher for 25 to 40 minutes, and passing it through a 200-mesh sieve to obtain the basic glass powder.

9. The described method for preparing lead slag glass-ceramics by oxidation and tempering of silicon-rich silicon slag is characterized by loading the above-mentioned basic glass powder into a mold, maintaining the pressure for 15-25 seconds under a pressure of 15-25 MPa and obtaining molding green body.

10. The described method for preparing lead slag glass-ceramics by oxidation and tempering of silicon-rich silicon slag is characterized by placing the formed shaping body into a crystallization furnace and heating it to 500-750° C. at a heating rate of 5-15° C./min for 2-5 hours, then raise the temperature to 950-1100° C. at a heating rate of 3-8° C./min for thermal insulation and sintering for 2-3 hours; lower the temperature to 830-960° C. at a cooling rate of 5-10° C./min, and maintain the temperature. After 1 to 2 hours, naturally cool to room temperature glass ceramics product.

Compared with the prior art, the present invention has the following advantages:

(1) In order to solve the problem of high elemental silicon content in silicon-rich silicon slag and its possible negative effects on precursor heterogeneity and glass-ceramic structure and performance, the present invention adopts the method of pre-oxidation and tempering of silicon-rich silicon slag, and further mix it with hot lead slag to prepare crystallized glass. This method not only increases the flexibility and adjustability of the oxidation degree of elemental silicon in silicon slag, but also makes full use of the high silicon component of silicon slag to adjust the low silicon content of lead slag, reflecting the complementary advantages of regional solid waste and forming an organic industry chain.

(2) The total percentage of smelting slag in the raw material is: 85-90 wt %, of which the content of silicon-rich silicon slag in the raw material is between 35-55 wt %, which not only reduces the environmental load caused by smelting slag, but also achieved the goal of collaborative high-value utilization of regional solid waste.

(3) Considering the actual discharge problem of lead slag, the present invention directly uses molten oxidized slag to temper the hot lead slag, which not only makes full use of the waste heat of the hot lead slag, but also reduces the process cost and provides a process that directly uses molten oxidized slag and hot lead slag to mix and fuse to prepare high-value glass-ceramics.

(4) The obtained crystallized glass has good mechanical properties and physical and chemical properties. The main crystalline phase of the glass ceramic includes magnetite and hematite, and the secondary crystalline phase includes albite and anorthosite.

Figure 2:
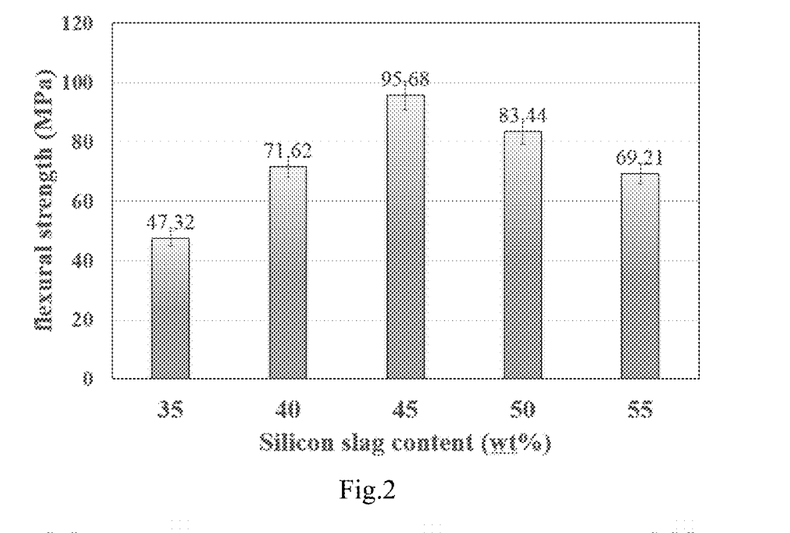
FIG. 2 is the schematic diagram of the flexural strength of glass-ceramics under different conditions.
Figure 3:
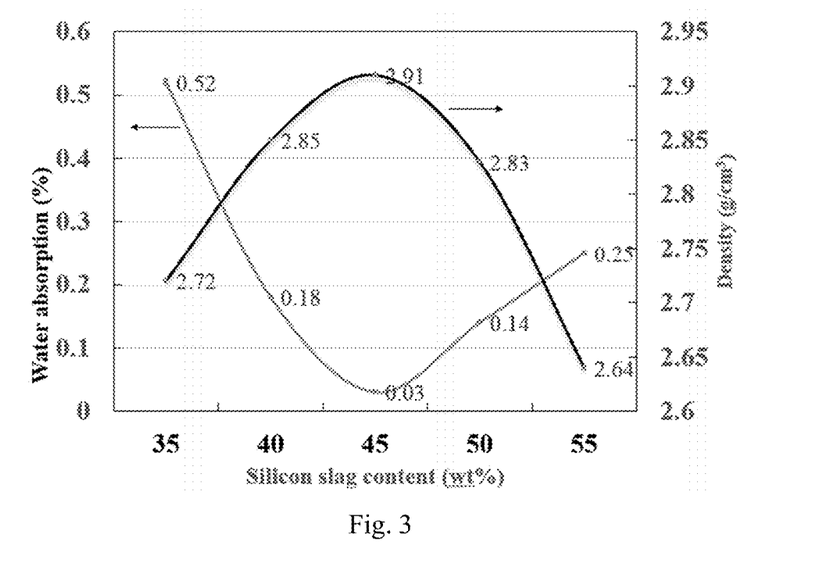
FIG. 3 is the schematic diagram of water adsorption and density of glass-ceramics under different conditions.

The volume density of the obtained crystallized glass is 2.64~2.91 g/cm$^3$, the water absorption rate is 0.03%~0.52%, the flexural strength is 47.32~95.68 MPa, Mohs hardness is 5~6, the acid resistance (1% sulfuric acid) is 0.03~0.09%, and the resistance to alkalinity (1% sodium hydroxide) is 0.01 to 0.06% (shown in FIGS. 2 and 3).

PREFERRED EMBODIMENTS

In order to better explain the present invention, the content of the present invention will be further elucidated below in conjunction with the examples, but the present invention is not limited only to the following examples.

In the following examples, the weight ratio between the components $SiO_2$, CaO, $Al_2O_3$, $Na_2O$, $K_2O$, MgO and ZnO in the silicon slag is 65-72:12-18:8-12:0.6-2:0.4-1:0.2-1:0.1-1; the silicon element in the silicon slag exists in the form of elemental silicon, silicon carbide and anorthite, and its weight ratio is 15-30:30-60:5-10;

The weight ratio between the components $SiO_2$, CaO, $Fe_2O_3$, $Al_2O_3$, ZnO and MgO in the lead slag is 32-36:10-20:20-30:5-10:2-6:1-4.

Example 1

Figure 1:
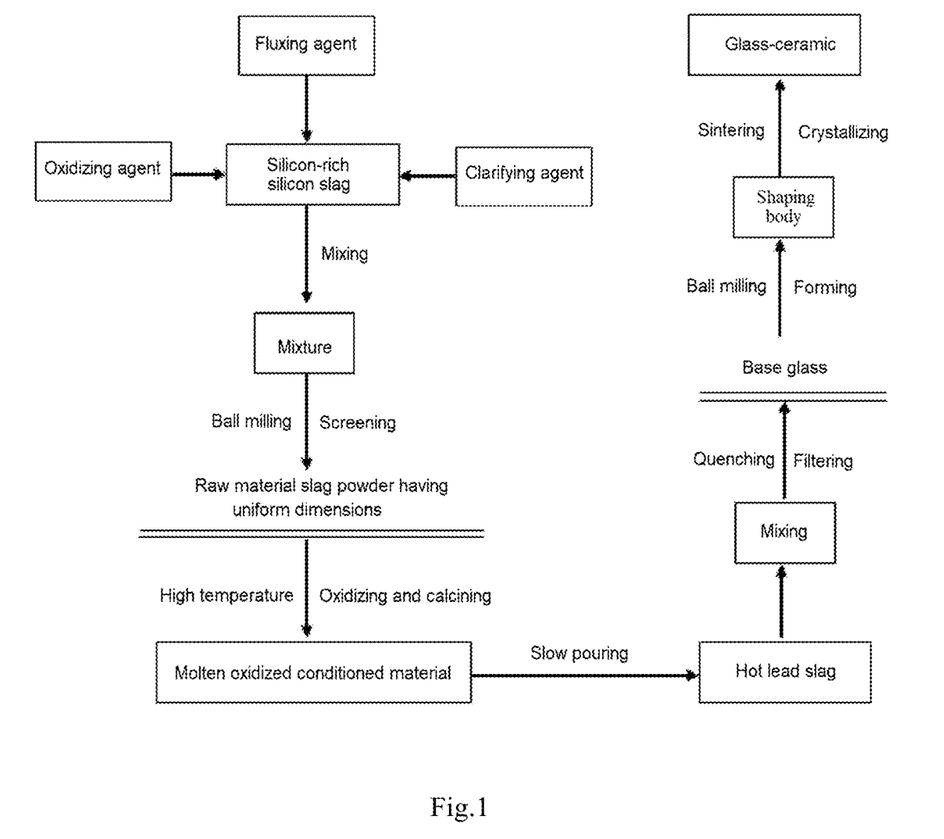
FIG. 1 is the process flow chart for preparing lead slag glass-ceramics by oxidizing and tempering silicon-rich silicon slag.

The invention provides a method for preparing lead smelting slag glass-ceramics based on the oxidation of silicon-rich silicon smelting slag and composition adjustment. The process flow chart of the preparation method is shown in FIG. 1, and the detailed operating steps are as follows:

Silicon slag oxidation conditioning material formula: The raw materials of silicon slag oxidation conditioning material include silicon slag, manganese dioxide, sodium nitrate, albite and borax, cerium oxide and sodium sulfate, of which silicon slag is the main raw material, manganese dioxide and sodium nitrate serve as oxidants, albite and borax act as fluxes, and cerium oxide and sodium sulfate act as clarifiers.

After drying, ball milling and sieving all the above raw materials, the formula was formulated according to a mass ratio of 55:1:7:2 between silicon slag, oxidant, flux and clarifier.

The process of preparing lead slag glass-ceramics using the above silicon slag oxidation conditioning material formula is as follows:

(1) In terms of mass fraction, first weigh 35 wt % of lead slag; then weigh 65 wt % of silicon slag oxidation conditioning material, where the mass ratio between silicon slag, oxidant, flux and clarifier is 55:1:7:2; The mass ratio of manganese dioxide and sodium nitrate used as oxidant is 1:0.5, the mass ratio of albite and borax used as flux is 6:0.3, and the mass ratio of cerium oxide and sodium sulfate used as clarifier is 1:3.

(2) Weigh the oxidized and tempered raw materials according to the formula of step (1), crush and mix them in a ball mill, pass through a 200 mesh sieve, put them into a crucible, melt and keep warm in a high-temperature box furnace at 1450-1500° C., after 2-3 hours, the oxidation-modified material melt is obtained.

(3) Mix and melt the oxidation tempering material melt in step (2) with the hot lead slag. The mixing and melting conditions are: mixing and melting at 1500° C. for 2 hours to form a glass melt with uniform composition.

(4) Transfer or pour the molten glass liquid in step (3) into water prepared in advance at a temperature lower than or equal to 25° C., and the glass liquid will instantly turn into glass particles. The glass particles are filtered from the water and dried at 100° C.

(5) Crush the basic glass frit after water quenching in step (4) in a crusher for 25 minutes, and pass it through a 200-mesh sieve to obtain basic glass powder.

(6) Put the basic glass powder mentioned in step (5) into the mold, hold it under a pressure of 15 MPa for 15 seconds and obtain a green body.

(7) Put the shaping body formed in step (6) into the crystallization furnace and heat it up to 500° C. at a heating rate of 5° C./min for 2 hours, and then heat it up to 950° C. at a heating rate of 3° C./min for heat preservation and sintering for 2h; reduce the temperature to 830° C. at a cooling rate of 5° C./min, keep it for 1 hour and then naturally cool to room temperature glass ceramics product.

(8) Grind, polish and cut the crystallized glass blank plate obtained in step (7) to obtain finished products of different specifications and glossiness.

(9) The main crystalline phases of lead slag glass-ceramics are magnetite and hematite, and the secondary crystalline phases are albite and anorthosite.

The volume density of this glass-ceramic is 2.72 g/cm³, the water absorption rate is 0.52%, the flexural strength is 47.32 MPa, Mohs hardness is 5, the acid resistance (1% sulfuric acid) is 0.03%, and the alkali resistance (1% sodium hydroxide) is 0.06%.

Example 2

The invention provides a method for preparing lead smelting slag glass-ceramics based on the oxidation of silicon-rich silicon smelting slag and composition adjustment. The process flow chart of the preparation method is shown in FIG. 1, and the detailed operating steps are as follows:

Silicon slag oxidation conditioning material formula: The raw materials of silicon slag oxidation conditioning material include silicon slag, manganese dioxide, sodium nitrate, albite and borax, cerium oxide and sodium sulfate, of which silicon slag is the main raw material, manganese dioxide and sodium nitrate serve as oxidants, albite and borax act as fluxes, and cerium oxide and sodium sulfate act as clarifiers.

After drying, ball milling and sieving all the above raw materials, the formula is formulated according to a mass ratio of 50:2:5:3 between silicon slag, oxidant, flux and clarifier.

The process of preparing lead slag glass-ceramics using the above silicon slag oxidation conditioning material formula is as follows:

(1) In terms of mass fraction, first weigh 40 wt % of the lead slag; then weigh 60 wt % of the silicon slag oxidation conditioning material, where the mass ratio between silicon slag, oxidant, flux and clarifier is 50:2:5:3; The mass ratio of manganese dioxide and sodium nitrate used as oxidant is 2:1, the mass ratio of albite and borax used as flux is 2:1, and the mass ratio of cerium oxide and sodium sulfate used as clarifier is 1:0.5.

(2) Weigh the oxidized and tempered raw materials according to the formula of step (1), crush and mix them in a ball mill, pass through a 200 mesh sieve, and put them into a crucible. Melt them in a high-temperature box furnace at 1450° C. and keep them warm for 2 hours, the oxidation-modified material melt is obtained.

(3) Mix and melt the oxidation tempering material melt in step (2) with the hot lead slag. The mixing and melting conditions are: mixing and melting at 1500° C. for 2 hours to form a glass melt with uniform composition.

(4) Transfer or pour the molten glass liquid in step (3) into water prepared in advance at a temperature lower than or equal to 25° C., and the glass liquid will instantly turn into glass particles. The glass particles are filtered from the water and dried at 100° C.

(5) Crush the basic glass frit after water quenching in step (4) in a crusher for 30 minutes, and pass it through a 200-mesh sieve to obtain basic glass powder.

(6) Put the basic glass powder mentioned in step (5) into the mold, hold it under a pressure of 20 MPa for 20 seconds and obtain a green body.
(7) Put the shaping body formed in step (6) into the crystallization furnace and heat it to 600° C. at a heating rate of 10° C./min for preheating for 3 hours, and then heat it up to 1000° C. at a heating rate of 5° C./min for heat preservation and sintering for 3h; reduce the temperature to 850° C. at a cooling rate of 5° C./min, keep it for 2 hours and then naturally cool to room temperature to obtain a glass-ceramic sample.
(8) Grind, polish and cut the crystallized glass blank plate obtained in step (7) to obtain finished products of different specifications and glossiness.
(9) The main crystalline phases of lead slag glass-ceramics are magnetite and hematite, and the secondary crystalline phases are albite and anorthosite.

The volume density of this glass-ceramic is 2.85 g/cm$^3$, the water absorption rate is 0.18%, the flexural strength is 71.62 MPa, Mohs hardness is 5, the acid resistance (1% sulfuric acid) is 0.05%, and the alkali resistance (1% sodium hydroxide) is 0.04%.

Example 3

The invention provides a method for preparing lead smelting slag glass-ceramics based on the oxidation of silicon-rich silicon smelting slag and composition adjustment. The process flow chart of the preparation method is shown in FIG. 1, and the detailed operating steps are as follows:

Silicon slag oxidation conditioning material formula: The raw materials of silicon slag oxidation conditioning material include silicon slag, manganese dioxide, sodium nitrate, albite and borax, cerium oxide and sodium sulfate, of which silicon slag is the main raw material, manganese dioxide and sodium nitrate serve as oxidants, albite and borax act as fluxes, and cerium oxide and sodium sulfate act as clarifiers.

After drying, ball milling and sieving all the above raw materials, the formula is formulated according to a mass ratio of 45:4:4:2 between silicon slag, oxidant, flux and clarifier.

The process of preparing lead slag glass-ceramics using the above silicon slag oxidation conditioning material formula is as follows:
(1) In terms of mass fraction, first weigh 45 wt % of lead slag; then weigh 55 wt % of silicon slag oxidation conditioning material, where the mass ratio between silicon slag, oxidant, flux and clarifier is 40:4:4:2; The mass ratio of manganese dioxide and sodium nitrate used as oxidant is 4:0.5, the mass ratio of albite and borax used as flux is 2:3, and the mass ratio of cerium oxide and sodium sulfate used as clarifier is 1:2.
(2) Weigh the oxidized and tempered raw materials according to the formula of step (1), crush and mix them in a ball mill, pass through a 200 mesh sieve, put them into a crucible, melt them in a high-temperature box furnace at 1500° C. and keep them warm for 3 hours, the oxidation-modified material melt is obtained.
(3) Mix and melt the oxidation tempering material melt in step (2) with the hot lead slag. The mixing and melting conditions are: mixing and melting at 1550° C. for 2.5 hours to form a glass melt with uniform composition.
(4) Transfer or pour the molten glass liquid in step (3) into water prepared in advance at a temperature lower than or equal to 25° C., and the glass liquid will instantly turn into glass particles. The glass particles are filtered from the water and dried at 150° C.
(5) Crush the basic glass frit after water quenching in step (4) in a crusher for 40 minutes, and pass it through a 200-mesh sieve to obtain basic glass powder.
(6) Put the basic glass powder mentioned in step (5) into the mold, hold it under a pressure of 25 MPa for 25 seconds, and obtain a green body.
(7) Put the shaping body formed in step (6) into the crystallization furnace and heat it up to 600° C. at a heating rate of 15° C./min for 3 hours, and then heat it up to 1050° C. at a heating rate of 5° C./min for heat preservation and sintering for 2h; reduce the temperature to 900° C. at a cooling rate of 8° C./min, keep it for 2 hours and then naturally cool to room temperature glass ceramics product.
(8) Grind, polish and cut the crystallized glass blank plate obtained in step (7) to obtain finished products of different specifications and glossiness.
(9) The main crystalline phases of lead slag glass-ceramics are magnetite and hematite, and the secondary crystalline phases are albite and anorthosite.

The volume density of the glass-ceramics is 2.91 g/cm$^3$, the water absorption rate is 0.03%, the flexural strength is 95.68 MPa, Mohs hardness is 6, the acid resistance (1% sulfuric acid) is 0.06%, and the alkali resistance (1% sodium hydroxide) is 0.04%.

Example 4

The invention provides a method for preparing lead smelting slag glass-ceramics based on the oxidation of silicon-rich silicon smelting slag and composition adjustment. The process flow chart of the preparation method is shown in FIG. 1, and the detailed operating steps are as follows:

Silicon slag oxidation conditioning material formula: The raw materials of silicon slag oxidation conditioning material include silicon slag, manganese dioxide, sodium nitrate, albite and borax, cerium oxide and sodium sulfate, of which silicon slag is the main raw material, manganese dioxide and sodium nitrate serve as oxidants, albite and borax act as fluxes, and cerium oxide and sodium sulfate act as clarifiers.

After drying, ball milling and sieving all the above raw materials, the formula is formulated according to a mass ratio of 40:3:5:2 between silicon slag, oxidant, flux and clarifier.

The process of preparing lead slag glass-ceramics using the above silicon slag oxidation conditioning material formula is as follows:
(1) In terms of mass fraction, first weigh 50 wt % of lead slag; then weigh 50 wt % of silicon slag oxidation conditioning material, where the mass ratio between silicon slag, oxidant, flux and clarifier is 40:3:5:2; The mass ratio of manganese dioxide and sodium nitrate used as oxidant is 3:5, the mass ratio of albite and borax used as flux is 6:1, and the mass ratio of cerium oxide and sodium sulfate used as clarifier is 1:3.
(2) Weigh the oxidized and tempered raw materials according to the formula of step (1), crush and mix them in a ball mill, pass through a 200 mesh sieve, put them into a crucible, melt them in a high-temperature box furnace at 1500° C. and keep them warm for 3 hours, the oxidation-modified material melt is obtained.
(3) Mix and melt the oxidation tempering material melt in step (2) with the hot lead slag. The mixing and melting conditions are: mixing and melting at 1550° C. for 2.5 hours to form a glass melt with uniform composition.

(4) Transfer or pour the molten glass liquid in step (3) into water prepared in advance at a temperature lower than or equal to 25° C., and the glass liquid will instantly turn into glass particles. The glass particles are filtered from the water and dried at 150° C.

(5) Crush the basic glass frit after water quenching in step (4) in a crusher for 40 minutes, and pass it through a 200-mesh sieve to obtain basic glass powder.

(6) Put the basic glass powder mentioned in step (5) into the mold, hold it under a pressure of 25 MPa for 25 seconds, and obtain a green body.

(7) Put the shaping body formed in step (6) into the crystallization furnace and heat it up to 700° C. at a heating rate of 15° C./min for 4 hours, and then heat it up to 1100° C. at a heating rate of 8° C./min for heat preservation and sintering for 2h; reduce the temperature to 920° C. at a cooling rate of 10° C./min, keep it for 2 hours and then naturally cool to room temperature to obtain a glass-ceramic sample.

(8) Grind, polish and cut the crystallized glass blank plate obtained in step (7) to obtain finished products of different specifications and glossiness.

(9) The main crystalline phases of lead slag glass-ceramics are magnetite and hematite, and the secondary crystalline phases are albite and anorthosite.

The volume density of this glass-ceramic is 2.83 g/cm3, the water absorption rate is 0.14%, the flexural strength is 83.44 MPa, Mohs hardness is 6, the acid resistance (1% sulfuric acid) is 0.06%, and the alkali resistance (1% sodium hydroxide) is 0.03%.

Example 5

The invention provides a method for preparing lead smelting slag glass-ceramics based on the oxidation of silicon-rich silicon smelting slag and composition adjustment. The process flow chart of the preparation method is shown in FIG. 1, and the detailed operating steps are as follows:

Silicon slag oxidation conditioning material formula: The raw materials of silicon slag oxidation conditioning material include silicon slag, manganese dioxide, sodium nitrate, albite and borax, cerium oxide and sodium sulfate, of which silicon slag is the main raw material, manganese dioxide and sodium nitrate serve as oxidants, albite and borax act as fluxes, and cerium oxide and sodium sulfate act as clarifiers.

After drying, ball milling and sieving all the above raw materials, the formula is formulated according to a mass ratio of 35:5:4:1 between silicon slag, oxidant, flux and clarifier.

The process of preparing lead slag glass-ceramics using the above silicon slag oxidation conditioning material formula is as follows:

(1) In terms of mass fraction, first weigh 55 wt % of the lead slag; then weigh 45 wt % of the silicon slag oxidation conditioning material, where the mass ratio between silicon slag, oxidant, flux and clarifier is 35:5:4:1; The mass ratio of manganese dioxide and sodium nitrate used as oxidant is 4:1, the mass ratio of albite and borax used as flux is 3:4, and the mass ratio of cerium oxide and sodium sulfate used as clarifier is 1:3.

(2) Weigh the oxidized and tempered raw materials according to the formula of step (1), crush and mix them in a ball mill, pass through a 200 mesh sieve, and put them into a crucible. Melt them in a high-temperature box furnace at 1500° C. and keep them warm for 2 hours, the oxidation-modified material melt is obtained.

(3) Mix and melt the oxidation tempering material melt in step (2) with the hot lead slag. The mixing and melting conditions are: mixing and melting at 1550° C. for 2.5 hours to form a glass melt with uniform composition.

(4) Transfer or pour the molten glass liquid in step (3) into water prepared in advance at a temperature lower than or equal to 25° C., and the glass liquid will instantly turn into glass particles. The glass particles are filtered from the water and dried at 150° C.

(5) Crush the basic glass frit after water quenching in step (4) in a crusher for 40 minutes, and pass it through a 200-mesh sieve to obtain basic glass powder.

(6) Put the basic glass powder mentioned in step (5) into the mold, hold it under a pressure of 25 MPa for 25 seconds, and obtain a green body.

(7) Put the shaping body formed in step (6) into the crystallization furnace and heat it to 750° C. at a heating rate of 15° C./min for preheating for 5 hours, and then heat it up to 1100° C. at a heating rate of 8° C./min for heat preservation and sintering for 2h; reduce the temperature to 960° C. at a cooling rate of 10° C./min, keep it for 2 hours and then naturally cool to room temperature to obtain a glass-ceramic sample.

(8) Grind, polish and cut the crystallized glass blank plate obtained in step (7) to obtain finished products of different specifications and glossiness.

(9) The main crystalline phases of lead slag glass-ceramics are magnetite and hematite, and the secondary crystalline phases are albite and anorthosite.

The volume density of this glass-ceramic is 2.64 g/cm$^3$, the water absorption rate is 0.25%, the flexural strength is 69.21 MPa, Mohs hardness is 6, the acid resistance (1% sulfuric acid) is 0.09%, and the alkali resistance (1% sodium hydroxide) is 0.01%.

Comparative Example 1

This comparative example provides a method for preparing crystallized glass. The steps of this method are as follows:

Silicon slag oxidation conditioning material formula: The raw materials of silicon slag oxidation conditioning material include silicon slag, albite and borax, cerium oxide and sodium sulfate, of which silicon slag is the main raw material, albite and borax act as fluxes, and cerium oxide and sodium sulfate serve as clarifier.

After drying, ball milling and sieving all the above raw materials, the formula is formulated according to a mass ratio of 55:5:1 between silicon slag, flux and clarifier.

The process of preparing lead slag glass-ceramics using the above-mentioned oxidation tempered raw materials is as follows:

(1) In terms of mass fraction, first weigh 40 wt % of the lead slag; then weigh 60 wt % of the silicon slag oxidation conditioning material, where the mass ratio between silicon slag, oxidant, flux and clarifier is 55:5:1; The mass ratio of albite and borax used as flux is 2:1, and the mass ratio of cerium oxide and sodium sulfate used as clarifier is 1:3.

(2) Weigh the oxidized and tempered raw materials according to the formula of step (1), crush and mix them in a ball mill, pass through a 200 mesh sieve, put them into a crucible, melt and keep warm in a high-temperature box furnace at 1450-1500° C., after 2-3 hours, the oxidation-modified material melt is obtained.

(3) Mix and melt the oxidation tempering material melt in step (2) with the hot lead slag. The mixing and melting conditions are: mixing and melting at 1500° C. for 1 hour, and a glass melt with uniform composition cannot be formed.

(4) Transfer or pour the molten glass liquid in step (3) into water prepared in advance at a temperature lower than or equal to 25° C. The glass liquid will turn into mostly black glass particles and a few off-white block solids.

Since no oxidant was added in comparative Example 1, the elemental silicon in the silicon-rich silicon slag could not be completely oxidized at high temperatures, resulting in the failure to obtain qualified glass-ceramics.

Comparative Example 2

This comparative example provides a method for preparing crystallized glass. The steps are the same as Example 2 of the present invention. The difference is that no silicon slag is added to the raw material of the oxidation conditioning material. The rest are the same as example 2.

Since no silicon slag was added in comparative example 2, the silicon content in the lead slag was low and the iron content was high, and obvious overflow occurred during the mixing step, resulting in the inability to obtain qualified glass-ceramics.

In summary, the present invention aims at the high elemental silicon content in silicon-rich silicon slag and its possible negative effects on the precursor heterogeneity and the structure and performance of the glass-ceramics, by pre-oxidizing and tempering the silicon-rich silicon slag, and further mix it with hot lead slag to prepare crystallized glass.

This method not only increases the flexibility and adjustability of the oxidation degree of elemental silicon in silicon slag, but also makes full use of the high silicon component of silicon slag to adjust the low silicon content of lead slag, reflecting the complementary advantages of regional solid waste and forming an organic industry chain.

In addition, the present invention takes into account the actual discharge problem of lead slag and directly uses molten oxidized slag to temper the hot lead slag, which not only fully utilizes the waste heat of the hot lead slag, but also reduces the process cost and provides a direct process for preparing high-value glass-ceramics by mixing molten oxidized slag and hot lead slag.

The total percentage of smelting waste slag in the raw materials in the present invention is 85 to 90 wt %, which not only reduces the environmental load caused by smelting slag, but also achieves the goal of collaborative high-value microcrystalline vitrification utilization of regional solid waste.

The obtained crystallized glass has high flexural strength, Mohs hardness and good corrosion resistance. It can be used as a structural or functional material and is widely used in the fields of construction, electronics and chemical industry.

We claim:

1. A method for preparing lead smelting slag glass-ceramics based on the oxidation of silicon-rich silicon smelting slag and composition adjustment, characterized in that raw materials includes 35-55% lead slag and 45-65% oxidation tempering raw material, and the sum of mass percentages of the lead slag and the oxidation tempering raw material is 100%;

the oxidizing tempering raw material includes silicon slag, oxidant, flux and clarifier; the lead slag includes $SiO_2$, CaO, $Fe_2O_3$, $Al_2O_3$, ZnO and MgO; the silicon slag includes $SiO_2$, CaO, $Al_2O_3$, $Na_2O$, KO, MgO and ZnO;

in the silicon slag, the weight ratio between $SiO_2$, CaO, $Al_2O_3$, $Na_2O$, $K_2O$, MgO and ZnO is 65-72:12-18:8-12:0.6-2:0.4-1:0.2-1:0.1-1; silicon element in the silicon slag exists in the form of elemental silicon, silicon carbide and calcium yellow feldspar, and a weight ratio of elemental silicon, silicon carbide and calcium yellow feldspar is 15-30:30-60:5-10;

a weight ratio of $SiO_2$, CaO, $Fe_2O_3$, $Al_2O_3$, ZnO and MgO in the lead slag is 32-36:10-20:20-30:5-10:2-6:1-4.

2. The method for preparing lead smelting slag glass-ceramics based on the oxidation of silicon-rich silicon smelting slag and composition adjustment according to claim 1, characterized in that the oxidation tempering raw material is a combination of silicon slag, oxidant, flux and clarifier, a mass ratio of silicon slag, oxidant, flux and clarifier is 35-55:1-5:4-7:1-3;

the oxidant includes manganese dioxide and sodium nitrate, with a mass ratio of manganese dioxide to sodium nitrate being 1-4:0.5-5; the flux includes albite and borax, with a mass ratio of albite to borax being 2-6:0.3-4; the clarifier includes cerium oxide and sodium sulfate, with a mass ratio of cerium oxide to sodium sulfate being 1-2:0.5-3.

3. The method for preparing lead smelting slag glass-ceramics based on the oxidation of silicon-rich silicon smelting slag and composition adjustment according to claim 1, comprising the following steps:

(1) prepare the oxidation tempering material in advance; weigh silicon slag, oxidant, flux and clarifier according to the formula amount to form an oxidation tempering batch; the oxidation tempering batch is melted to form an oxidation tempering material melt;

(2) prepare lead slag glass-ceramics; mix the oxidation tempering material melt formed in step (1) with hot lead slag and clarify it to form a basic glass liquid; the basic glass liquid is quenched with water, crushed, after formation and crystallization, crystallized glass is formed; the melting temperature is 1450-1500° C. and kept for 2-3 hours to obtain the oxidation tempering material melt;

conditions for mixing the oxidation tempering material melt and the hot lead slag are: mixing at 1500-1550° C. for 1-2.5 hours to form a glass liquid with uniform composition; transfer or pour the high-temperature glass liquid into pre-prepared water below 25° C., and the glass liquid instantly turns into glass particles; filter the glass particles out of the water and dry them at 120-170° C.;

crush the water-quenched basic glass frit in a crusher for 25-40 minutes, and then pass it through a 200-mesh sieve to obtain basic glass powder;

put the above basic glass powder into the mold, hold it under a pressure of 15-25 MPa for 15-25s and obtain a shaping body;

put the formed green body into the crystallization furnace and heat it up to 500-750° C. at a heating rate of 5-15° C./min for preheating for 2-5 hours, and then heat it up to 950-1100° C. at a heating rate of 3-8° C./min; Carry out heat preservation and sintering for 2-3 hours; lower the temperature to 830-960° C. at a cooling rate of 5-10° C./min, keep it for 1-2 hours and then naturally cool to room temperature to obtain glass-ceramics product.

\* \* \* \* \*